(No Model.) 2 Sheets—Sheet 1.

H. HAUSSMANN.
VETERINARY MOUTH SPECULUM.

No. 548,194. Patented Oct. 22, 1895.

Witnesses
Wm. F. Hanning
Wm. M. Siheem

Inventor
Hermann Haussmann
by Elliott & Onohundro
Attorneys.

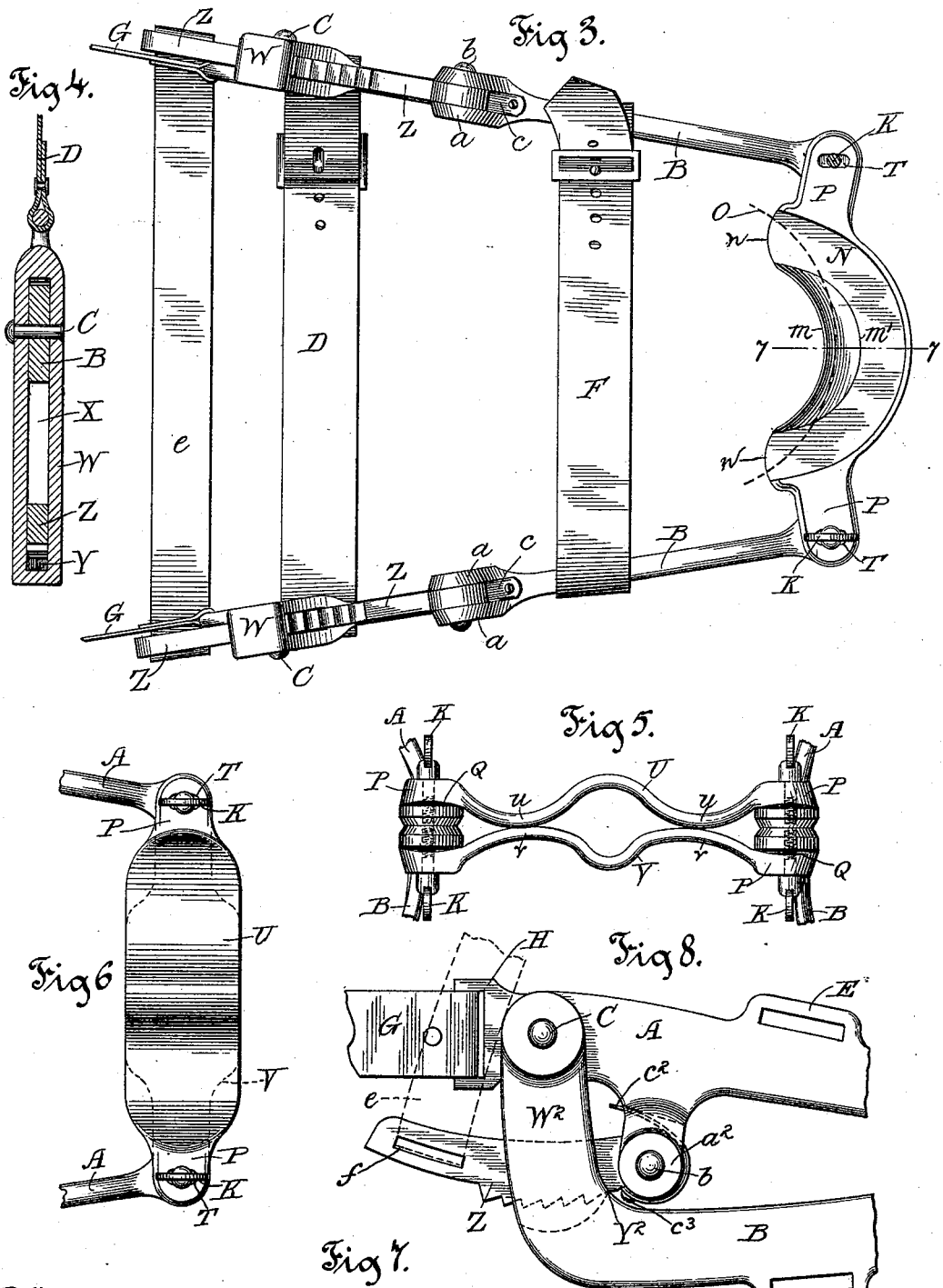

UNITED STATES PATENT OFFICE.

HERMANN HAUSSMANN, OF CHICAGO, ILLINOIS.

VETERINARY MOUTH-SPECULUM.

SPECIFICATION forming part of Letters Patent No. 548,194, dated October 22, 1895.

Application filed March 22, 1892. Serial No. 425,927. (No model.)

*To all whom it may concern:*

Be it known that I, HERMANN HAUSSMANN, a citizen of the United States, residing at Chicago, in the county of Cook and State of Illinois, have invented certain new and useful Improvements in Mouth-Speculums, of which the following is a full, clear, and exact specification.

My invention relates to mouth-speculums, and more particularly to that class used by veterinarians for holding open the jaws of horses and kindred animals while operating upon or treating the interior of the mouth or teeth, or for other purposes.

My improvements have more especial reference to the means for locking the jaws of the speculum in their distended or open position, and also to improvements in the devices which engage with the animal's teeth or gums for forcing and holding its mouth open.

One object of my invention is to provide simple and effective means for holding the jaws of the speculum open to any desired extent, which shall be out of the way of, so as not to interfere with, the operator or surgeon and be incapable of pinching or injuring the animal's flesh.

Another object of my invention is to so construct the gum or teeth pieces or spreader-bars that they will adjust themselves to the teeth or gums of different animals—that is to say, so that each will rock on an axis passing lengthwise thereof.

A further object is to so form the teeth plates or bars as to adapt them for the reception of rows of teeth of various lengths and curvatures.

A further object is to provide the speculum with interchangeable teeth and gum plates or bars, whereby one of each or two of either kind may be employed; and a still further object is to provide gum plates or bars which may be used in lieu of the teeth bars or plates and which will fit the contour of the animal's gums and mouth.

With these ends in view my invention consists in certain features of novelty in the construction, arrangement, and combination of parts hereinafter described in connection with the accompanying drawings, and more particularly pointed out in the claims.

Figure 1:
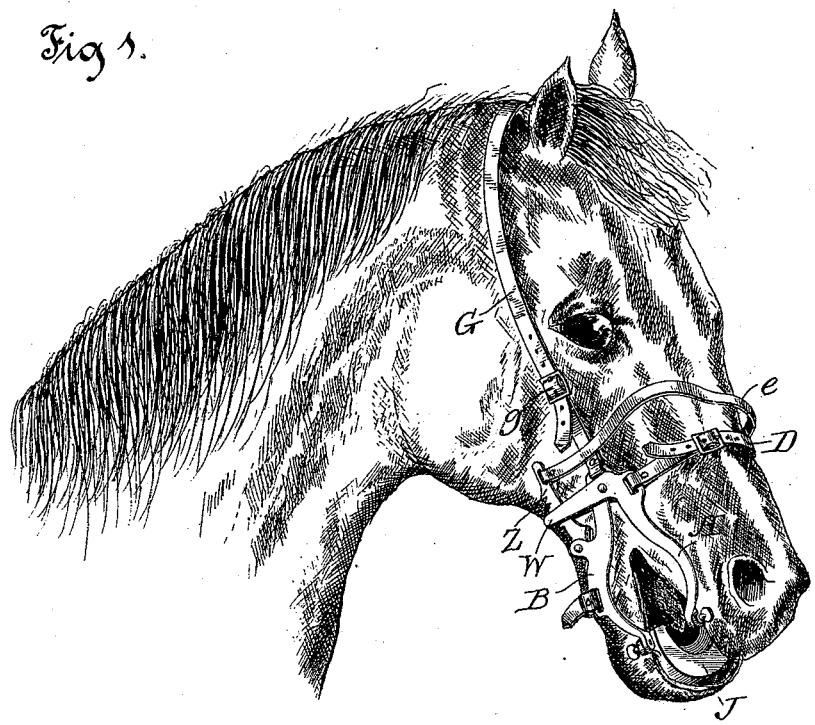
Figure 2:
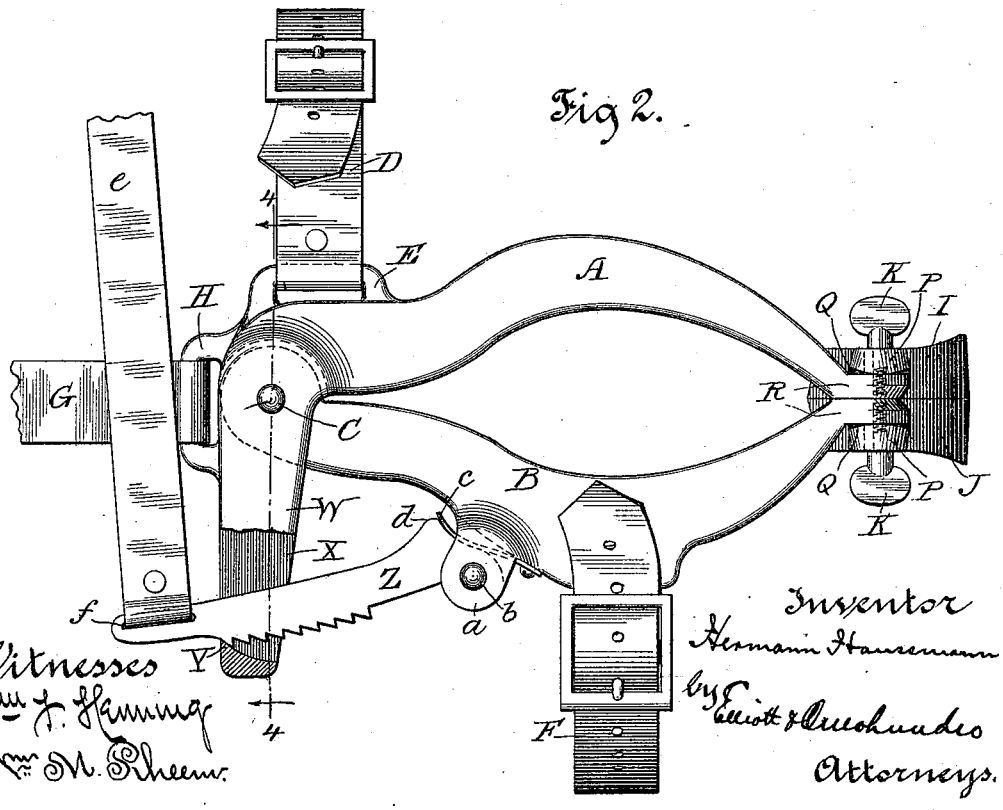

In the said drawings, Figure 1 is a general view showing my improved speculum applied to the mouth of a horse. Fig. 2 is an enlarged view of the same in side elevation. Fig 3 is a bottom plan view. Fig. 4 is a detail sectional view taken on the line 4 4, Fig. 2. Fig. 5 is a front view with rear portions broken away showing the gum-plates or spreader-bars applied to the jaws of the speculum instead of the teeth-plates or spreader-bars shown in figures above described. Fig. 6 is a plan view of the gum plates or bars shown in Fig. 5. Fig. 7 is a detail sectional view taken on the line 7 7, Fig. 3; and Fig. 8 is a side elevation of a modification hereinafter described, portions being broken away.

In the drawings, wherein like signs of reference indicate like parts throughout the several views, A and B are, respectively, the upper and lower jaws of the speculum, which are pivoted together at C and duplicated, of course, on both sides. The jaws, as shown in the drawings, are curved away from each other, so as to leave the sides of the animal's mouth clear, to enable the surgeon to work from the sides without interference from the speculum-jaws or other parts.

The jaw A may be provided with the usual nose-strap D, secured thereto in any desired manner, as by the link E, while the lower jaw B is provided with a chin-strap F, which may be secured thereto in the same manner. The rear or upper end of one of the jaws adjacent to the pivot C, preferably the upper jaw A, may be secured to a head-strap G by means of any suitable link H, which strap passes behind the animal's ears in the manner of an ordinary halter or bridle, thus securing the speculum on the animal's head, with the jaws A and B lying to either side or the mouth.

When it is desired that the pressure of the speculum should be brought to bear on the animal's front teeth or incisors for forcing the mouth open, the forward or lower ends of the upper and lower jaws are provided with upper and lower teeth plates or bars I J, respectively, which are secured thereto, preferably, by means of thumb or set-screws K, and each of which plates, as more clearly shown in Fig. 7, is provided around its forward edge with a curved flange L and around its inner edge with a curved but inwardly-inclined flange M, the two flanges forming a groove or seat N for the animal's front teeth or incisors, it being, of course, understood that the flanges on the lower plate J project downwardly, while those on the upper plate project upwardly.

The bottom of the groove or seat N is preferably flat throughout its extent and its ends $n$ are without flanges. Hence, should the speculum be applied to an animal whose row of incisors is longer than the curved seat N, the flanges L M would surround the foremost incisors of the row and the two ends of the row of teeth would simply project beyond the ends $n\ n$ of the seat N without interfering in the least with the application of the plate to the teeth; and furthermore, by reason of the peculiar formation of the inclined flange M, whose inner edge $m$ is formed on a greater curve than its outer edge $m'$, as more clearly shown in Fig. 3, adapts the device for application to animals whose incisors are arranged on different arcs or curves. Thus, for instance, should the plate be applied to a row of teeth arranged in the arc represented by the dotted line O, Fig. 3, the teeth would occupy a position near the inner edge $m$ of the flange M, while a row of teeth arranged on a smaller curvature would occupy a position near the outer edge $m'$ of the flange M, more in conformity with the seat N. In order that these plates or bars I J may adjust themselves to the level or plane of the teeth, their bearing ends P, which project beyond the flanges L on both sides, are provided with beveled or rounded faces Q, as shown in Fig. 2, which rest upon seats R, formed on the extremities of the jaws A B, thus permitting the plates or bars I J to rock upon these seats and accommodate themselves to the plane of the animal's teeth and thereby afford a uniform bearing and avoid unequal pressure on the teeth. The plates I J are held in place on their seats R by means of the set-screws K, as described, which engage in threaded perforations or sockets, (not shown,) in the seats R, but pass loosely through slots or enlarged holes T, formed in the bearing ends P, as shown in Fig. 3.

When it is desired to apply the pressure to the animal's gums instead of its teeth for forcing the mouth open, the teeth plates or bars I J are removed by unscrewing the thumb-taps K, and in their stead the gum plates or bars U V, as shown in Fig. 5, are secured by means of the screws K, as explained. These gum-plates are likewise provided with bearing-extensions P, whose bearing-surfaces are rounded or beveled, as shown at Q, like the extensions P of the plates I J, and for the same purpose. The gum-plates are broad and flat, as shown in Fig. 6, and the upper one U is provided at its center with an upwardly-curved portion, as shown in Fig. 5, which fits the contour of the roof of the animal's mouth, and on either side of which is a downwardly-curved portion $u$, which portions $u$ form seats in which the gums of the upper jaw rest. The lower plate V is provided at its center or midlength with a downwardly-curved portion, which, however, is more acute or formed on a shorter radius than the upward-curved portion of the plate U, so as to fit the contour of the central portion of the lower jaw, and on either side of this downwardly-curved portion is an upwardly-curved portion $v$, which latter form seats for and rest upon the gums on either side of the lower jaw, it being, of course, understood that these gum-plates are applied at a point between the incisors and the molars.

The upper jaws A on both sides are provided at their upper or inner ends with downwardly-projecting arms W, which are provided with slots X, in which the upper ends of the lower jaws B are pivoted by means of the pivot C, and at the lower end of each of these slots X is formed a stationary dog or pawl Y, which is adapted to engage with a toothed bar or rack Z pivoted in a pair of ears $a$ on each of the jaws B by means of a pin $b$, the racks Z projecting through the slotted arms W. Thus it will be seen that when the jaws A B of the speculum are forced apart, the dog or pawl Y will be engaged by the teeth on the rack Z, and thus prevent such rack from being withdrawn from the arm W, and consequently prevent the jaws from being closed until the rack is disengaged from the dog Y. The rack Z will ordinarily fall into engagement with the dog Y through its own gravity, but in order to insure its engagement I prefer to provide a spring $c$, which may be secured to the jaw B between the ears $b$ and bear upon a shoulder or heel $d$, formed on the end of the rack Z. It will also be seen that by providing one jaw with the arm W and arranging the rack Z below the other jaw the locking device is entirely outside of the operating space formed between the jaws and out of the way of the operator, and affords free access to the animal's mouth and at the same time avoids pinching the animal's flesh.

When it is desired to release the jaws A B and permit the animal to close its mouth, it is only necessary to raise the rack-bar Z from engagement with the dogs Y, but as this necessitates the raising of the bars Z on both sides of the speculum at once, I prefer to connect these bars or racks Z together in some suitable manner, as by means of a strap $e$, which may be passed upward over the horse's nose or head and its ends attached to the racks Z, respectively, in any suitable manner, as by means of slots $f$, formed in the ends of the racks Z, and through which the ends of the strap $e$ pass. Thus by giving the strap $e$ a slight upward pull the bars or racks Z will be released simultaneously and the animal permitted to close the jaws.

It will of course be understood that the gum-plates may, if desired, be covered with rubber or any other soft substance in the usual manner.

In the form shown in Fig. 8 I have provided the lower jaw B with a portion or extension $W^2$, which extends downardly from the hinge at an angle to the general direction of the jaws and is slotted or bifurcated, and between the bifurcations of which the upper jaw A is pivoted. The upper jaw A is provided with a lug or arm $a^2$, to which the rack Z is pivoted by means of the pin $b$, as before described, and the rack Z, as in the other instance, projects between the bifurcations of the extension $W^2$ and is engaged by the dog $Y^2$ at the bottom of the slot of the extension $W^2$, as shown in dotted lines, for holding the jaws asunder. In this instance, however, the rack Z is drawn inward by the opening of the jaws, whereas in the form before described such movement of the jaws pushes the rack outward, the teeth on the racks and the dogs Y and $Y^2$ in the two forms being turned in opposite directions. In this modification the rack Z may be forced into engagement with the dog $Y^2$ by means of the spring $c^2$, secured to the rack at $c^3$ and bearing upon the under side of the jaw A.

The jaws of the speculum, when constructed in the manner shown in Fig. 8—that is to say, the lower jaws being provided at their hinges with the downwardly-curved portions or arms $W^2$—are in close simulation of the jaw-bones of the animal. This feature is of the utmost importance, for the lower jaw-bones of the animal being formed approximately like the lower jaws of this form of my speculum, and the speculum-jaws being shorter than the jaw-bones of the animal, it will be seen that when the mouth opens the jaws of the speculum, especially the lower jaws, would cross the sides of the animal's mouth were it not for these curved portions or arms $W^2$. When the jaws of the speculum thus cross the animal's mouth they are directly in the way of the surgeon, but with the jaws having the downwardly-extending arms $W^2$ this is not possible, for the upper and lower jaws at their rear ends, or point of pivotal connection, are, approximately speaking, permanently arranged as far apart as the animal's jaws are capable of spreading at this point, which point being, of course, beyond or above the corner of the animal's mouth, and hence that portion of the lower jaws of the speculum between the arms $W^2$ and the teeth-plate will always be below or back of the animal's lips. Thus it will be seen that the arm or curved portion $W^2$ performs a function in addition to that performed, or capable of being performed, by the arm W first described. It not only provides a means for the engagement of the rack Z and enables me to carry such rack backward out of the way instead of arranging it transversely of the jaw E, as heretofore, but in addition it drops the lower jaw down out of the surgeon's way, leaving room to operate on the teeth or mouth from the sides, as explained, and in this respect it is equivalent to curving the jaw in the manner shown in the form of my invention first described.

Having thus described my invention, what I claim as new therein, and desire to secure by Letters Patent, is—

1. In a speculum, the combination with two pairs of hinged jaws having spreader bars or plates, of arms projecting from one pair of said jaws and carrying dogs or pawls, and toothed racks projecting from the other pair of said jaws and adapted to engage said dogs, said racks and dogs being arranged at the rear or hinged ends of the jaws, so as not to cross the animal's mouth, substantially as set forth.

2. In a speculum, the combination of two pairs of hinged jaws having spreader bars, one pair of said jaws having arms or extensions projecting therefrom and being provided with upwardly projecting dogs or pawls, racks pivoted to the other pair of said jaws and having teeth on their under sides, adapted to gravitate into engagement with said dogs or pawls, said extensions and racks being arranged at the rear or upper ends of the jaws adjacent to their hinges, substantially as set forth.

3. In a speculum, the combination with upper and lower pairs of hinged jaws having spreader plates or bars, of slotted arms or extensions projecting from the hinge or pivotal point of said jaws and being provided with dogs or pawls, and toothed racks pivoted to the outer side of the jaws of the lower pair respectively, and projecting through said slotted arms or extensions so as to engage said dogs, substantially as set forth.

4. In a speculum, the combination with two pairs of hinged jaws, of plates or bars extending across the ends of said jaws and being yieldingly seated thereon so as to rock on an axis passing lengthwise thereof, substantially as set forth.

5. In a mouth speculum, the combination with the hinged jaws having seats R, at their extremities, of plates or bars having rounded or beveled bearings resting upon said seats and being removably secured thereto, substantially as set forth.

6. In a mouth speculum, the combination with the hinged jaws having seats at their extremities, of plates or bars extending across said jaws and having beveled or rounded bearings resting upon said seats and being provided with slots or enlarged perforations, and set screws passing through said slots or perforations into said seats, substantially as set forth.

7. In a mouth speculum, the combination with the two pairs of hinged jaws, of gum plates or bars adapted to be secured to the upper and lower jaws respectively, the upper one of said plates or bars having the up-curve U and the down curves $u$, and the lower one having the up-curves $v$ at each end and the sharp down-curve V at its mid-length, whereby said plates or bars will fit the contour of the animal's mouth and gums, substantially as set forth.

8. In a mouth speculum, the combination with the hinged jaws, of the teeth plate or bar having a flat seat N surrounded on the outer side by an upright flange L and on the inner side by the inclined flange M, the ends of said seat being open, substantially as set forth.

9. In a mouth speculum, the combination of two pairs of oppositely curved jaws hinged together at their rear ends, plates or bars extending across each pair of said jaws at their other ends, and means for locking or fastening said jaws located at their extreme rear or hinged ends so as not to cross the animal's mouth, substantially as set forth.

10. In a mouth speculum, the combination of two pairs of jaws hinged together at their upper or rear ends, bars extending across each pair of said jaws at their lower or forward ends, said jaws being outwardly and oppositely curved between said plates and hinges, and pawls and racks for holding said jaws apart arranged at the extreme rear or hinged ends of the jaws so as not to cross the animal's mouth, substantially as set forth.

11. In a mouth speculum, the combination of two pairs of hinged jaws, the jaws of one pair of which are provided with portions extending downwardly from their hinged ends, a spreader bar extending across each pair of said jaws, and means for holding the jaws asunder, engaging with said downwardly extending portions, substantially as set forth.

12. In a speculum, the combination with two pairs of hinged jaws provided with spreader bars, of locking devices arranged at the extreme rear or hinged ends of said jaws and adapted to hold them asunder so as not to cross the animal's mouth, substantially as set forth.

HERMANN HAUSSMANN.

Witnesses:
R. C. OMOHUNDRO,
F. A. HOPKINS.